W. B. Barnes,
Clock.
No. 30,558. Patented Nov. 6, 1860.
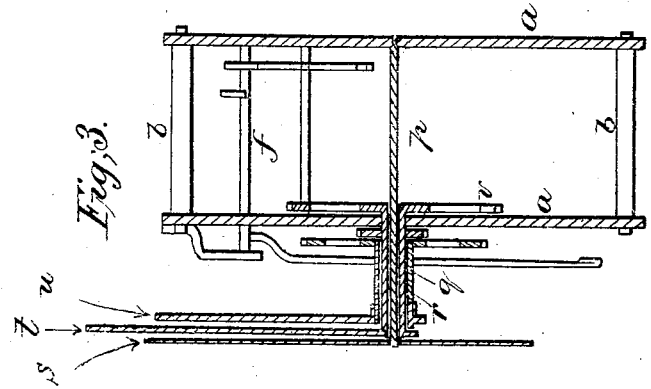
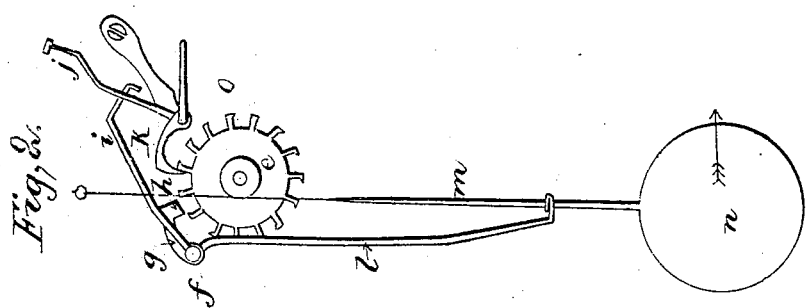
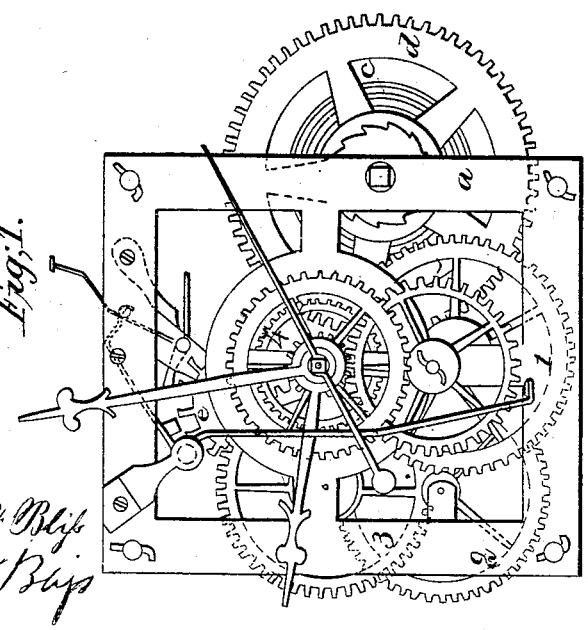
Witnesses;
Edward W. Bliss
Henry W. Bliss
Inventor;
Wm. B. Barnes

UNITED STATES PATENT OFFICE.

WILLIAM B. BARNES, OF FORESTVILLE, CONNECTICUT.

CLOCK.

Specification of Letters Patent No. 30,558, dated November 6, 1860.

*To all whom it may concern:*

Be it known that I, WILLIAM B. BARNES, of Forestville, county of Hartford, and State of Connecticut, have invented certain new and useful Improvements in the Construction and Arrangement of Clock-Movements; and I do hereby declare that the same is described and represented in the following specification and drawings, and to enable others skilled in the art to make and use the same I will proceed to describe its construction and operation, referring to the drawings, in which the same characters indicate like parts in each of the figures.

This improvement in clocks relates to a peculiar manner of constructing and arranging, of all, or nearly all, old parts in a new manner, and in a close compact form, having three pointers to indicate time, for a pendulum clock.

In the accompanying drawings Figure 1, shows the arrangement of the parts or movements complete. Fig. 2, is a sectional side view, showing the manner of constructing the treble spindle for the pointers. Fig. 3, shows the escape wheel, the verge, and the detent arrangement, by which the uniformity and accuracy of the movement are secured.

$a$ are the plates or frame work of the clock movement, secured at the proper distance apart by the posts $b$.

$c$, is the main spring which actuates the movement of the clock, and is secured upon the shaft with the first moving wheel $d$. Said shaft is also provided with a pawl and ratchet wheel as in the ordinary way. The motion is transmitted through the wheels (as ordinarily used in clocks) 1, 2, 3, 4, from the moving wheel $d$ to the escape wheel $e$.

$f$, is the verge shaft.

$g$, is the verge.

$i$ is a stirrup extending out from the verge shaft and taking hold of the arm $j$, of the detent $k$.

$l$, is an arm extending downward from the verge shaft $f$, having a stirrup on its lower end, in or through which the pendulum rod $m$, passes, and by means of which, impulse is given to the pendulum $n$.

It will be seen that when motion is given to the pendulum $n$ (after the spring $c$, is wound up) in the direction of the dart, that the pallet or repost $h$, of the verge $g$, is lifted out of the teeth $o$, of the escape wheel $e$, and the detent $k$ is dropped into the teeth by the action of the stirrup $i$, on its arm $j$. Thus the escape wheel $e$, (or its teeth $o$,) acts only on one end of the verge or pallet $h$. Consequently it gives but a single impulse. The arm or stirrup $i$, from the verge shaft acts on the arm of the detent $k$ which allows it to rest until the verge has moved far enough, so that the escape wheel tooth $o$, will strike on the repose or pallet $h$. Then the detent $k$, is moved from the tooth by the action of the stirrup $i$ and the tooth strikes on the repose and rests there until the pendulum returns. Then the tooth slips off from the repose onto the pallet which gives the impulse to the pendulum. In this arrangement it will be seen that the triangular shaped teeth $o$, of the escape wheel $e$ are important in connection with the escapement, as the verge or repose $h$, about fills the space between the teeth, so as to prevent drop and loss of power. If the teeth were pointed and the verge or repose $h$ filled at the point, it would bind, as it approached the center of the wheel. The tooth is so shaped as to obviate that difficulty and to give part of the impulse to the pendulum $n$ through the arm $l$.

In Fig. 2, $p$ is the spindle on the outer end of which the seconds-hand is secured, so as to allow it to be of such length, as to describe the whole surface of the dial. One end of said spindle takes its bearing in the back plate $a$, the front end passes through the socket spindle $r$, which has its (the spinble $r$) bearing in the front plate $a$, and is driven by the gear $v$, just back of the front plate and moves the minute hand or pointer $t$, and the socket spindle $q$, takes its bearing on the spindle $r$, and is driven by a gear just outside of the front plate, and moves the hour pointer $u$. By this arrangement I am enabled to make a cheaper handsomer and reliable pendulum clock, and in a more compact form, and so as to indicate on a dial the hour minute and second of time.

I believe I have described the construction and arrangement of my improvement so as to enable a person skilled to make the same, and also the advantage derived therefrom.

What I claim therefore and desire to secure by Letters Patent is—

1. The arrangement of the verge $g$ detent $k$ triangular shaped escape wheel teeth $o$ in combination with a pendulum $n$ substantially as and for the purpose described.

2. The arrangement of the pointer spindles, and gearing attached thereto, substantially as, and for the purpose described.

WM. B. BARNES.

Witnesses:
EDWARD W. BLISS,
JEREMY W. BLISS.